United States Patent [19]

Satoh

[11] Patent Number: 4,748,317
[45] Date of Patent: May 31, 1988

[54] OPTICAL READER

[75] Inventor: Koji Satoh, Osaka, Japan

[73] Assignee: Sumitomo Electric Industries, Ltd., Osaka, Japan

[21] Appl. No.: 674,757

[22] Filed: Nov. 26, 1984

[30] Foreign Application Priority Data

Nov. 25, 1983 [JP] Japan .................................. 58-220550

[51] Int. Cl.$^4$ ............................................. G06K 7/10
[52] U.S. Cl. ................................... 235/462; 235/436; 235/470; 382/11; 382/62
[58] Field of Search ............... 235/440, 462, 436, 470; 382/11, 62

[56] References Cited

U.S. PATENT DOCUMENTS

| | | | |
|---|---|---|---|
| 3,275,806 | 9/1966 | Quinn et al. | 235/440 X |
| 4,408,344 | 10/1983 | McWaters et al. | 235/440 X |
| 4,411,016 | 10/1983 | Wakeland | 235/440 X |

Primary Examiner—David L. Trafton
Attorney, Agent, or Firm—Eliot S. Gerber

[57] ABSTRACT

An improved optical reader for reading both bar codes and alphanumeric characters with one image sensor wherein a switching gate selects either one of two digital signal processing means, so that there does not occur processing of both formats concurrently. The optical reader recognizes the binary pattern of the specific format.

4 Claims, 3 Drawing Sheets

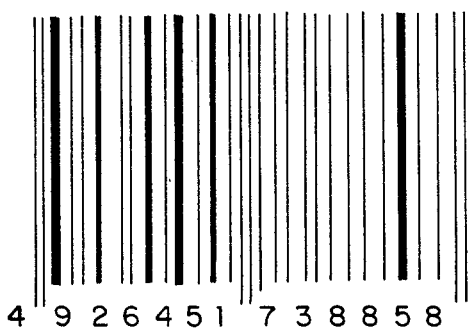
FIG. 4
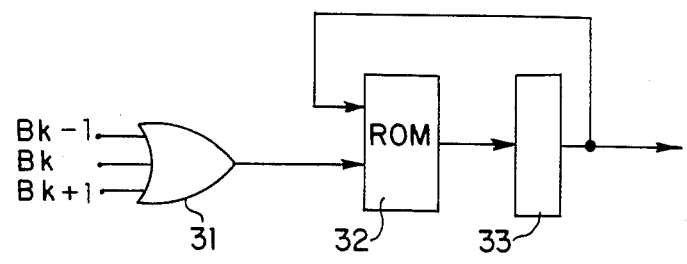
FIG. 5
FIG. 6a  clock timing
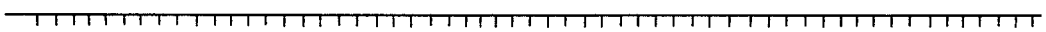
FIG. 6b  binary signal
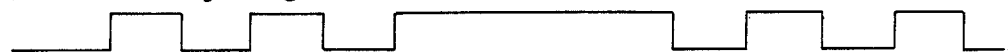
FIG. 6c  black bar pulse
FIG. 6d  white bar pulse
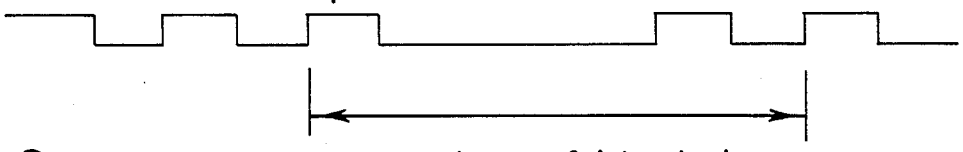
FIG. 6e  normalized number of black bars
FIG. 6f  normalized number of white bars

OPTICAL READER

FIELD OF THE INVENTION

The present invention relates to optical readers and more particularly to a scanner which is an optical reader capable of recognizing both alphanumeric characters and bar codes. The scanner is equipped with an image sensor having a two-dimensional array of photoelectric elements.

BACKGROUND OF THE INVENTION

Optical readers are widely used in department stores, supermarkets and recently in cargo transportation systems to read the data on containers or tags and derive information about sales amount, inventory, or the destinations of goods to be transported. In a system called "Point of Sales", for instance, product information about the species, manufacturing lot and and price are printed on a merchandising tag in an optically readable form. The tag is read by an optical reader and the information obtained by the reader is sent to a computer system, which processes the information to provide a list of data.

However, the way of expressing the product data is not uniform. In department stores often the tags for foods and beverages have their data expressed in numbers and bar codes (the numbers being beneath the bar codes) while data on clothes is expressed in alphanumeric characters. Therefore, it has become necessary to install optical readers which are capable of reading both alphanumerics and bar code symbols.

U.S. Pat. No. 4,402,088 relates to a hand-held optical reader, i.e., a "scanner", which will read either a bar code or alphanumeric format without the operator having to manually switch between the two, depending upon which the unit is reading.

According to that patent, the hand-held reader produces electrical signals representative of data scanned from the document and processes the obtained data by two examination means concurrently. It produces an output representative either of alphanumeric characters or of bar codes, followed by gating out of one of the outputs of the two examination means, but not both of them.

In U.S. Pat. No. 4,402,088, McWaters et al, the same hand-held scanner reads either alphanumeric or bar code formats without operator intervention to switch from one to the other. Its method of reading the two formats, with the same scanner, is the same as the methods disclosed in its preceding published Japanese Patent Application No. 13307/77 (Feb. 9, 1977) of Saitoh, which is Publication No. 98733/78 (Aug. 29, 1978).

In the above-cited references, two signal processing means are used concurrently. The first processing means processes the binary signals obtained from the photoelectric elements to provide recognition results from characters. The second processing means processes the binary signals, obtained from the photoelectric elements, concurrently to obtain recognition results from bar codes.

In these references, the final recognition results are selected when they are meaningful. There is high possibility for the optical readers of these references to unnecessarily process the signals of a pattern which is neither character nor bar code, and this leads to occasional misreading of meaningless stains or spots on the surface of the document.

SUMMARY OF THE INVENTION

The present invention provides an optical reader, for example, a hand-held scanner, which is capable of recognizing both bar code and alphanumeric characters using a single scanner unit. The scanner has an image sensor which is a two-dimensional array of photoelectric elements. A switching gate determines whether the binary pattern seen by the scanner is a bar code or an alphanumeric character. After the switching occurs, the binary pattern is processed using either the character recognition circuitries or bar code recognition circuitries.

BRIEF DESCRIPTION OF THE DRAWINGS

In the drawings:

FIG. 4 illustrates a bar code format;

FIG. 5 is a block diagram showing the switching gate;

FIGS. 6 (a)-6(d) show signals detected during the process of recognizing bar code format; and FIGS. 6 (e)-6(f) show black and white bars detected after processing.

DETAILED DESCRIPTION OF THE PREFERRED EMBODIMENTS

Figure 1:
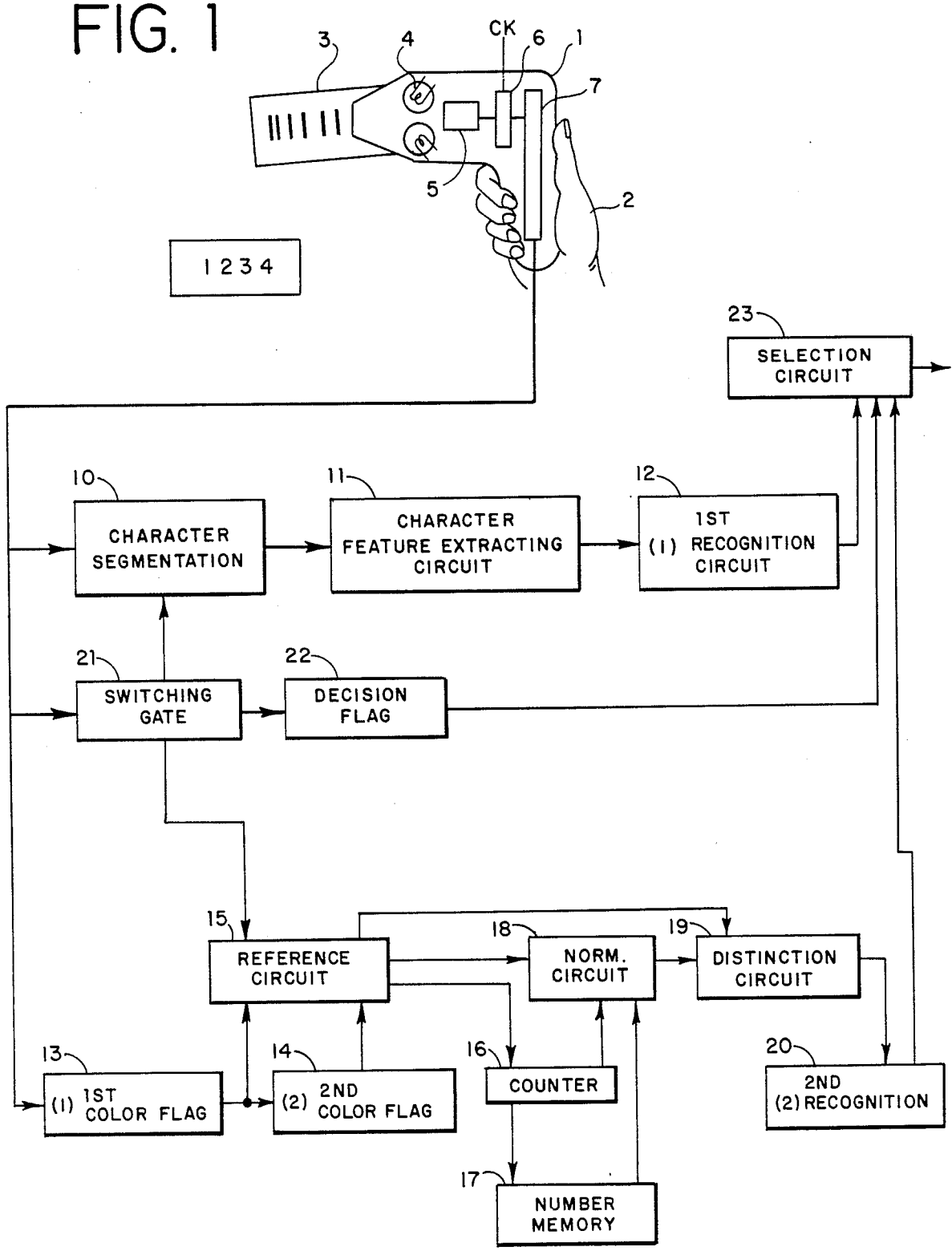
FIG. 1 is a block diagram of the optical reader of the present invention.

FIG. 1 is a block diagram showing the optical reader of the present invention.

Information expressed on a sheet of paper 3 by alphanumeric character format or bar code format is scanned by a hand-held scanner 1 equipped with an image sensor 6 composed of a two-dimensional array of photoelectric elements. Light beams from projection lamp 4 are reflected by either characters or bar codes ("object information"), whichever is on the surface of paper 3, and a pattern corresponding to the object information is focused on the image sensor 6 through an optical focusing lens 5.

The degrees of intensity of the reflected beams varies depending on from where they are reflected. Consequently, the output signals from photoelectric elements of the image sensor 6 are digitalized according to a threshold level and expressed by binary circuit 7. The digital signals correspond to character/bar code and paper background respectively. For instance, character/bar code (black zone) is signaled as "1" and paper background (white zone) is signaled as "0".

Figure 2:
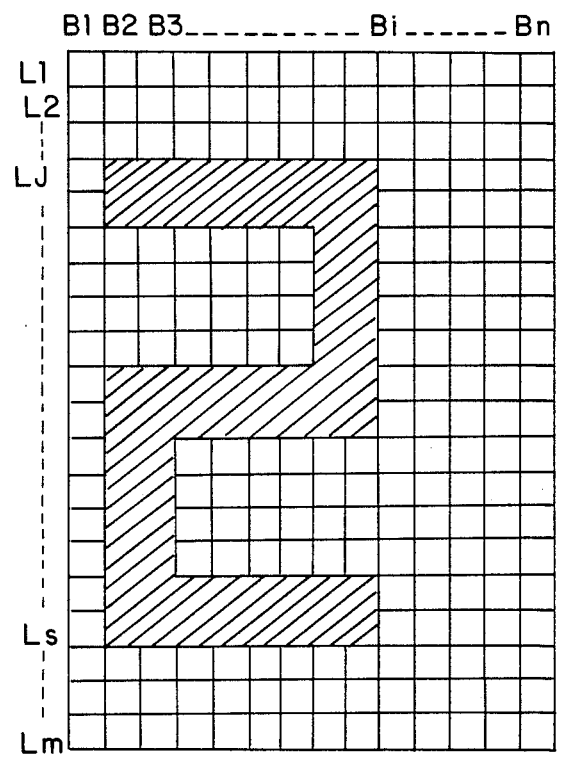
FIG. 2 illustrates a binary pattern of the alphanumeric character "2"

FIG. 2 illustrates a binary pattern of alphanumeric format "2" as seen in the image sensor 6 with two-dimensional array of n×m pieces of photoelectric elements. In FIG. 2 the back zone is distinguished from the white zone by oblique lines. The binary circuit 7, seen in FIG. 1, initiates its output digital signal corresponding to the output of photoelements in the column B1 and line L1 of FIG. 2.

The output signals corresponding to the photoelectric element in column B2, in the same line L1, in the array is digitalized in the same manner.

After all of the output signals in line L1 are digitalized and signaled in the order of B1, B2, ... Bi ... Bn, the photoelements in line L2 are digitalized and signaled in the same manner and sequence until all the photoelements in all lines are processed by the binary circuit 7. As the scanning period for the image processor 6 and binary circuit 7 is much shorter, in time, compared to the movement of the hand-held scanner, a plurality of binary patterns are obtained.

The method of recognizing a bar code format is described in connection with FIG. 3. As described above, in the case of reading an alphanumeric character, a binary pattern of a bar code format, as seen in the image sensor 6, is illustrated in FIG. 3.

A switching gate 21, shown in FIG. 1, determines whether the binary pattern is derived from a character or a set of bar codes in the manner described below. The switching gate 21, as shown in FIG. 5, is composed of an OR gate 31 and a read-only memory (ROM) 32 and a register 33.

Figure 3:
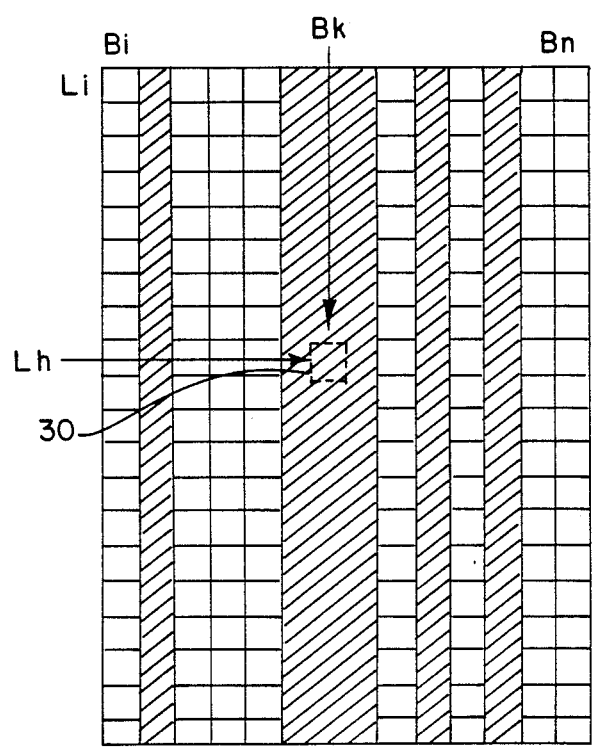
FIG. 3 is a partial view of a binary pattern of a bar code format.

In FIG. 3 the photoelectric elements, of n×m pieces, are aligned two dimensionally and consist of lines L1-Lm, and columns B1-Bn. The black bars of the format are expressed, in FIG. 3, by oblique lines within the corresponding pattern.

The photoelement which is located in line Lh and column Bk, shown by the arrows in FIG. 3, is utilized for recognizing the presence of a bar code format.

The OR gate 31 determines the logical sum of the binary signals of the black bars in the adjacent successive three columns of Bk−1, Bk, and Bk+1 for every line of the sensor array. Therefore, logical sum becomes "1" when a black bar is present on at least one photoelectric element in the above three columns (Bk−1, Bk or Bk+1). According to the procedures of the present invention, a signal corresponding to the logical sum of the binary signals of Bk−1, Bk, and Bk+1 in line L1 is utilized as an address signal to ROM 32 together with the content of register 33. The contents of register 33 are cleared each time just before the signal from the first line L1 is outputted.

Logical sum signal corresponding to line L2 is outputted as an address signal to ROM 32 together with the contents of the register 33 related to the line L1. Similar procedures are repeated until all of the lines from L1 to Lm have been scanned on the successive three columns of Bk−1, Bk and Bk+1.

ROM 32 has a set of registry for the necessary status of bar code formats and thus the status of the presently scanned signals of bar code formats are recognized through the output of register 33.

Determination of whether scanned information on a sheet is expressed by a bar code format or alphanumeric format is judged in the following manner:

When the logical sum in columns Bk−1, Bk, and Bk+1 on line L1 is A1, and for line Lm the logical sum for columns Bk−1, Bk and Bk+1 is AM; and When the number of successive lines where each of the logical sum is equally "1" is a, this means, for example, if there is black bar in Bk−1 or Bk or Bk+1 in rows L2-L5 then "a"=4 ;and When the presence of black zone is not indicated by the logical sum of the binary signal on both lines adjacent to the consecutive "a" lines, where the logical sums are "1"s, the object pattern corresponds to an alphanumeric character format $$b \leq a \leq c \qquad (1)$$

where b and c are predetermined positive constant values respectively. In the above example where a=4, b is set at 8 and C at 16.

In contrast, when the object pattern is a set of bar code format, $$a \geq d \qquad (2)$$

where d is a predetermined positive constant depending on the (vertical) length of bar code format to be scanned, for example, d=20, provided that one of the logical sums of the binary signals is "1" for the first or last lines of the binary pattern, i.e., that either A1 or AM is "1". In any event, d is preferably larger than the longest vertical line of the alphanumeric pattern to be scanned. In the example above, the logical sum is from three columns, Bk−1 to Bk+1; however, the logical sum may use more columns and may even be all the columns, i.e., B1 through BN.

After the object pattern under scan is determined in terms of its category, i.e. bar code or alphanumeric, the pattern is recognized and identified according to the following methods:

A binary pattern of alphanumeric format is illustrated in FIG. 2, where corresponding photoelectric elements of an image sensor are shown. In order to determine whether the character is located within sight of the image sensor, the presence of the character pattern is confirmed by means of character segmentation circuit 10, shown in FIG. 1.

The character segmentation circuit 10 operates, for instance, in such a manner as the character position is in a correct centered position to produce signals representing the character when binary signal is "0" (white background) in every photoelectric element in column B1 and when signal "1", which is indicative of the presence of a character, is detected in at least one line on column B2 through Bn−1 and then only "0" signals are obtained from the final column Bn. As described above, the character segmentation circuit 10 operates only after the switching gate 21 determines that the scanned object pattern corresponds to an alphanumeric format and outputs signals to 10. Consequently, the above-described position detection, by circuit 10, is not carried out when the object pattern is determined as one corresponding to a bar code format.

Various methods of character recognition, based on the binary pattern of the character, are well known. For instance, U.S. Pat. No. 4,180,800 discloses a typical method for extracting a character's features, either in line or column segments, of its binary pattern, followed by trailing a status transition flow diagram according to the order of occurrence of its features.

According to the disclosure of the U.S. Pat. No. 4,180,000, each segment feature is extracted and classified into "feature code" categories.

In the case of the binary pattern in FIG. 2, line Lj provides a feature category of "a long horizontal line" while the segment in line Lj+2 is classified into a feature of "a spot on the right-side marginal segment".

The combinaton of the character features in the order of their occurrence provides final recognition results of alphanumeric format "2" as indicated in FIG. 2.

A bar code format is also recognized by means of circuitries 15-20, as shown in FIG. 1. Scanning a character format and scanning of the binary pattern in FIG. 3 are both completed within a relatively short period of time (200 microseconds) for one full scanning from line L1 to line Lm. A plurality of scanning results are obtained during one passage of an image sensor over a bar code format. For recognizing a bar code format, either the number of occurrences of "black" or "white" bars are detected, utilizing a selected number of photoelectric elements in a sensor array. The widths of the bars are determined based on the above numbers of occurrence of either of the white or black bars during the scan. The method of recognizing a bar's code format is described in detail as follows:

A bar code format is recognized utilizing a photoelectric element 30, shown in FIG. 3, which is located in line Lh on column Bk in the alignment of the elements. In FIG. 1, illustrating a preferred embodiment of the present invention, binary circuit 7 outputs a signal to the first color flag 13 (digital memory) indicating whether the binary signal from the photoelectric element 30 is "0" (white background) or "1" (black bar). When the next signal from the circuit 7 is outputted to the first color flag 13, the contents of 13 have already been transferred to the second color flag 14, indicating precedent status of the first color flag 13.

Reference circuit 15 compares the contents of the first color flag 13 with those of the second color flag 14 and the two contents are added in counter 16 when both are the same. When the two signals are different, it means that either a white bar or a black bar has passed over the photoelectric element 30 and detection of the width of either of the white bar or the black bar has been completed. In this case reference circuit 15 outputs signals to normalizing circuit 18 and counter 16 is cleared of its contents.

There is high probability of misreading some strains or granules of dust, on the surface of the sheet of paper, as being black bars of a bar code format when scanned by conventional optical readers. In the device of the present invention, the contents of the counter 16 are cleared only when object binary pattern represents a bar code format and when switching gate 21 outputs signal to reference circuit 15 and thus eliminates misreading due to noise caused by substances on the paper surface other than the data to be read.

Another object of the present invention is to eliminate miscounting the numbers of either black bars or white bars caused by inconstancy of the velocity of the hand-held scanner as it is passed over the surface of paper. This improvement is made by detecting both "start marks" and "stop marks" which are usually afforded to bar code format.

The above bar code format "start marks" and "stop marks" are illustrated in FIG. 4 and the distance between the start mark and stop mark is usually predetermined. An image sensor begins to scan the bar code format when either the start mark or stop mark, which is the first black bar, is detected. At that time the contents of counter 16 is placed in standard number memory 17.

Bar count normalizing circuit 18 adjusts the number of pulses for black or white bars utilizing its standard number taken from memory 17 for start mark or stop mark. Thus the standard black bar pulse count "A" in a memory 17 is compared with the observed pulse count "B" in counter 16 for black bar or for white bar and the value "B" is adjusted as follows:

$$Cadj = k \times B/A \quad (3)$$

where k is a predetermined positive value, and Cadj is an adjusted pulse count.

The output signal of normalizing circuit 18 provides the width of black or white bar.

The output of normalizing circuit 18 corresponds to the width of either of a black bar or a white bar. Bar code distinction circuit 19 distinguishes black bar from white bar and detects bar-width by referring both the bar-width signal, outputted by normalizing circuit 18, and status signal from reference circuit 15.

The second recognition circuit 20 recognizes numerals or marks depending on the occurrence of black bars and white bars with references to their width after a series of information concerning a series of bar codes within an area defined by a pair of start mark and stop marks have been received.

FIGS. 6(a)-6(e) illustrates signals when bar code format in FIG. 4 is scanned by traversing a hand-held scanner of FIG. 1 over a document. The clock time for scanning is shown in FIG. 6(a) and digital signals outputted by binary circuit 7, corresponding to black bar "1" and white bar "0" are shown in pulse signals in FIG. 6(b). FIGS. 6(c) and 6(d) show relevant number of signals detected for black bar and white bar respectively.

They are normalized as illustrated in FIGS. 6(e) and 6(f). As is understood from FIG. 6(e) and FIG. 6(f), both the first and the second black bars are either the start mark or stop mark. A figure begins at the first "white bar" followed by "black bar"/ "white gap"/ "black bar". The second black bar is used as a stop mark. According to the order of occurrence of the above-described bars, white bar of unit width / black bar of four units width / white bar of unit width are observed. The recognition results for this bar code format is found to be "9" when the above order of occurrence is referred to a predetermined code principle.

Selection circuit 23 outputs final recognition results based on information provided by the first recognition circuit 12, the second recognition circuit 20 and decision flag 22. According to the description of the preferred embodiments of the present invention, bar code recognition is performed by utilizing a photoelectric element 30.

It is easily understood that the same results are obtained by utilizing a predetermined number of elements in an array.

In FIG. 1, which illustrates construction of the optical reader of the present invention, binary circuit 7 is located in a body of a hand-held scanner as an element. It is, however, also easily understood that the circuit 7 be installed in a separate processing terminal, if such a design is favorable.

As described above, the present invention provides an optical reader which is capable of recognizing both alpanumeric and bar code format with one scanner.

The optical reader of the present invention recognizes either character or bar code format, after determining whether the digitalized object pattern is character or bar code, and thus is able to read merchandise tag with both formats more accurately than conventional optical reading devices.

What is claimed is:

1. An optical reader for scanning and recognizing an object information field consisting of alphanumeric characters and bar codes, including:
    an image sensor having a two-dimensional array of photoelectric elements each of which provides an output signal and which represents a binary matrix of column and line segments;

focusing means for transmitting and focusing the object field on the image sensor;

digitalizing means for providing a binary signal pattern representing the object field by digitalizing the output signals of each of the photoelectric elements in the sensor array;

calculating means for calculating the logical sum of black area in either of the line or column segments of the binary matrix to detect whether a selected number of consecutive lines or columns has at least one photoelectric element which detects the presence of a character or a bar code;

object determination means for determining whether the object field is a character or a bar code, by detecting and calculating the number of consecutive lines or columns having at least one photoelectric element which detects the presence of a character or a bar code in either the line or column segments; with the object determination means detecting line segments if the calculating means detects column segments and the object determination means detecting column segments if the calculating means detects line segments;

first recognition circuit means for recognizing a character according to a binary pattern; and second recognition circuit means for recognizing a width of a bar code;

switching gate means for operating either of the first or second circuit recognition means, but not both concurrently, according to the results from the object determination means.

2. An optical reader as in claim 1 wherein the means for recognizing the width of a bar code includes:

clock means for generating a series of signals which are a scanning frequency; and counting means to compare the scanning frequency to the processed digital signal generated from at least one photoelectric element.

3. An optical reader as in claim 1 wherein said means for recognizing the width of a bar code includes means for recognizing a bar code by processing both the degree and the order of occurrence of the digital signals outputted from at least one photoelectric element.

4. An optical reader according to claim 1 wherein the means to recognize a bar code includes means for processing data of both the degrees and frequency of scanning the bar code pattern, classification data on width and color of the bar in the format, and the order of occurrence of the color and width of the bar in the format.

* * * * *